(12) United States Patent
Huppert

(10) Patent No.: US 8,713,848 B2
(45) Date of Patent: May 6, 2014

(54) MODULAR BOTTOM BOUNCER

(76) Inventor: Mikel Huppert, Ellsworth, WI (US)

( * ) Notice: Subject to any disclaimer, the term of this patent is extended or adjusted under 35 U.S.C. 154(b) by 175 days.

(21) Appl. No.: 12/800,032

(22) Filed: May 6, 2010

(65) Prior Publication Data

US 2011/0271581 A1    Nov. 10, 2011

(51) Int. Cl.
*A01K 85/00* (2006.01)
*A01K 85/10* (2006.01)
*A01K 95/00* (2006.01)

(52) U.S. Cl.
USPC ......... 43/43.14; 43/43.15; 43/43.1; 43/44.91; 43/42.09; 43/42.11; 43/42.13; 43/42.39

(58) Field of Classification Search
USPC .............. 43/43.1, 43.14, 43.15, 42.74, 44.84, 43/44.96, 44.9, 44.91, 44.87, 42.09, 42.11, 43/42.13, 42.22, 42.39, 42.08
See application file for complete search history.

(56) References Cited

U.S. PATENT DOCUMENTS

| 810,017 | A | * | 1/1906 | Ackerman | 43/42.09 |
|---|---|---|---|---|---|
| 1,232,167 | A | * | 7/1917 | Arnold | 43/44.92 |
| 1,345,173 | A | * | 6/1920 | Halder | 43/42.11 |
| 1,515,849 | A | * | 11/1924 | Eppinger | 43/42.19 |
| 1,522,451 | A | * | 1/1925 | Hayes | 43/42.08 |
| 1,546,701 | A | * | 7/1925 | Bailer | 43/42.11 |
| 1,564,147 | A | * | 12/1925 | Stickley et al. | 43/43.12 |
| 1,582,171 | A | * | 4/1926 | Foss | 43/42.39 |
| 1,656,440 | A | * | 1/1928 | Lemaire | 43/44.92 |
| 1,713,041 | A | * | 5/1929 | Fey | 43/44.86 |
| 1,727,936 | A | * | 9/1929 | Pflueger | 43/42.08 |
| 2,036,954 | A | * | 4/1936 | Murray | 43/42.08 |
| 2,127,639 | A | * | 8/1938 | Breuer | 43/42.09 |
| 2,214,668 | A | * | 9/1940 | Erickson | 43/42.08 |
| 2,284,564 | A | * | 5/1942 | Ebersole | 43/44.92 |
| 2,295,292 | A | * | 9/1942 | Rogers | 43/42.09 |
| 2,476,088 | A | * | 7/1949 | Gleason | 43/43.14 |
| 2,587,736 | A | * | 3/1952 | Kindscher | 43/42.09 |
| 2,589,715 | A | * | 3/1952 | Lysikowski | 43/43.14 |
| 2,590,633 | A | * | 3/1952 | Lucas | 43/42.09 |
| 2,594,620 | A | * | 4/1952 | Braithwaite | 43/44.9 |
| 2,651,133 | A | * | 9/1953 | Sharps | 43/42.37 |
| 2,674,823 | A | * | 4/1954 | Gellings | 43/42.39 |
| 2,741,057 | A | * | 4/1956 | Morris et al. | 43/42.09 |
| 2,750,702 | A | * | 6/1956 | Hartig | 43/42.17 |
| 2,765,569 | A | * | 10/1956 | Claybrook | 43/42.26 |
| 2,796,695 | A | * | 6/1957 | Meulnart | 43/42.19 |
| 2,907,133 | A | * | 10/1959 | Myers | 43/43.1 |
| 2,940,204 | A | * | 6/1960 | Mehnert | 43/42.09 |

(Continued)

FOREIGN PATENT DOCUMENTS

| DE | 19544873 A1 | * | 6/1997 | A01K 85/00 |
|---|---|---|---|---|
| FR | 2587172 A1 | * | 3/1987 | A01K 85/00 |
| JP | 2005287361 A | * | 10/2005 | A01K 85/00 |
| JP | 2009060863 A | * | 3/2009 | A01K 85/00 |

*Primary Examiner* — Darren W Ark
(74) *Attorney, Agent, or Firm* — DL Tschida

(57) ABSTRACT

An improved fishing weight or "bottom bouncer" wherein a flexible wire support arm includes an offset bent region that cooperates with an exposed cavity and internal depression at a weighted ballast piece threaded onto the arm. Reciprocating movement of a latch piece mounted to the arm prevents or permits the arm to flex in the ballast piece to attach and detach the bent region from the depression. The support arm also provides a line attachment bend having defined shoulders that maintain a preferred alignment of the sinker to a supporting fishing line. An alternative, single arm bottom bouncer sinker is also disclosed.

20 Claims, 4 Drawing Sheets

(56) References Cited

U.S. PATENT DOCUMENTS

| | | | |
|---|---|---|---|
| 2,981,029 A * | 4/1961 | Markoff-Moghadam | 43/44.95 |
| 3,012,356 A * | 12/1961 | Tyson | 43/42.11 |
| 3,091,883 A * | 6/1963 | Hufford | 43/42.09 |
| 3,137,960 A * | 6/1964 | Sharp | 43/42.09 |
| 3,137,962 A * | 6/1964 | Linley, Sr. | 43/43.15 |
| 3,180,052 A * | 4/1965 | Malesko | 43/44.97 |
| 3,205,609 A * | 9/1965 | Knapton | 43/42.09 |
| 3,220,139 A * | 11/1965 | Bessler | 43/42.09 |
| 3,417,503 A * | 12/1968 | Meulnart | 43/42.08 |
| 3,461,597 A * | 8/1969 | Hobson | 43/43.14 |
| 3,468,053 A * | 9/1969 | Lux | 43/44.96 |
| 3,500,576 A * | 3/1970 | Ostrom | 43/42.09 |
| 3,698,119 A * | 10/1972 | Levoin | 43/42.08 |
| 3,740,803 A * | 6/1973 | Arteburn | 43/43.12 |
| 3,750,323 A * | 8/1973 | Weis | 43/42.39 |
| 3,760,468 A * | 9/1973 | Linville | 24/908 |
| 4,121,366 A * | 10/1978 | McClellan | 43/42.09 |
| 4,161,838 A * | 7/1979 | Gapen | 43/42.11 |
| D258,305 S * | 2/1981 | Dickinson et al. | D22/145 |
| D259,436 S * | 6/1981 | Dickinson et al. | D22/145 |
| D259,505 S * | 6/1981 | Dickinson et al. | D22/145 |
| 4,314,420 A * | 2/1982 | Dickinson et al. | 43/42.39 |
| 4,428,144 A * | 1/1984 | Dickinson | 43/42.39 |
| D274,081 S * | 5/1984 | Smith | D22/134 |
| 4,447,981 A * | 5/1984 | Bauer | 43/42.21 |
| 4,467,550 A * | 8/1984 | Haulk | 43/44.97 |
| D278,927 S * | 5/1985 | Uzell | D22/145 |
| 4,536,986 A * | 8/1985 | Stout | 43/42.11 |
| 4,727,676 A * | 3/1988 | Runyan | 43/43.1 |
| 4,750,289 A * | 6/1988 | Rossa | 43/44.96 |
| 4,756,115 A * | 7/1988 | Reyen | 43/42.74 |
| 4,924,618 A * | 5/1990 | McGahee | 43/42.22 |
| 5,027,545 A * | 7/1991 | Lowrie et al. | 43/43.12 |
| 5,065,542 A * | 11/1991 | Lindaberry | 43/42.74 |
| 5,090,151 A * | 2/1992 | Salminen | 43/42.05 |
| 5,105,575 A * | 4/1992 | Robertaccio | 43/44.8 |
| 5,189,828 A * | 3/1993 | Summers | 43/43.1 |
| 5,253,447 A * | 10/1993 | Rhinehart | 43/42.74 |
| 5,369,906 A * | 12/1994 | Anterni | 43/42.09 |
| 5,537,775 A * | 7/1996 | Crumrine | 43/42.39 |
| 5,555,668 A * | 9/1996 | Brasseur | 43/43.15 |
| 5,595,015 A * | 1/1997 | Jensen | 43/42.19 |
| 5,887,379 A * | 3/1999 | Lockhart | 43/42.13 |
| 5,887,380 A * | 3/1999 | Matlock | 43/42.74 |
| 6,047,493 A * | 4/2000 | Strampe | 43/44.96 |
| 6,327,808 B1 * | 12/2001 | Zascavage | 43/42.09 |
| 6,691,450 B2 * | 2/2004 | Glavinich | 43/43.1 |
| 6,898,894 B1 * | 5/2005 | Anderson | 43/42.39 |
| 7,117,629 B2 * | 10/2006 | Brzozowski | 43/43.15 |
| 7,621,070 B2 * | 11/2009 | Brasseur | 43/44.9 |
| 7,621,071 B2 * | 11/2009 | Brasseur | 43/44.87 |
| 7,757,426 B2 * | 7/2010 | Kemp | 43/43.15 |
| 2001/0005954 A1 * | 7/2001 | Hermanson | 43/43.1 |
| 2005/0217165 A1 * | 10/2005 | Anderson | 43/42.09 |
| 2008/0172924 A1 * | 7/2008 | Thorne | 43/42.39 |
| 2009/0211145 A1 * | 8/2009 | Thorne | 43/43.15 |
| 2010/0281756 A1 * | 11/2010 | Lau | 43/42.13 |

* cited by examiner

MODULAR BOTTOM BOUNCER

BACKGROUND OF THE INVENTION

The present invention relates to an improved modular fishing weight and in particular to a bottom bouncer type sinker wherein a wire formed support is adapted to accept weights of different sizes and provide a double shouldered line-attachment bend.

Fishing weights or sinkers can comprise any device or item that can be attached to a fishing line to submerse further attached hook(s), artificial and/or live bait. Most weights designed for attachment to a fish line are molded or formed from lead, bismuth, steel or another dense, non-corroding, economical materials that are not buoyant in water (i.e. have a specific gravity greater than that of the fish containing water).

Wide varieties of special purpose fishing sinkers have been developed for salt and fresh water fishing with differing shapes and some of which include cast apertures, channels or eyelets. Some sinkers include accessory pieces (e.g. a formed wire) that attach to or are molded into the sinker. Freshwater sinkers outfitted with wire supports are commonly referred to as "bottom bouncers". Of the former types, so called "egg" type sinkers provide a longitudinal bore that allows the sinker to slide on a support line.

Of the latter type, bottom bouncer sinkers provide an eye or eyelet at a bent wire support to receive a fish line. A weight or ballast member molded to the wire weights the sinker and a portion of the wire typically extends in a fashion to prevent or minimize snagging. The weight is normally rigidly molded to the wire support. Some exemplary sinkers with wire supports are shown at U.S. Pat. Nos. 2,589,715; 3,137,962; 4,161,838; 4,428,144; 4,750,289; 5,253,447; D274,081 and published application 2001/0005954.

Bottom bouncers find particular appeal to fisherpersons who troll live bait spinner rigs, artificial baits and the like either while drifting or under power. Ideally and depending upon the boat speed, the wire support contacts the bed of the body of water and supports the weight above the bottom as an attached fishing line and bait is suspended above the bottom. The wire form permits the sinker to slide along the bottom or glide above the bottom which minimizes snagging of associate rocks, wood, debris and fauna found growing from the lake, stream, river or ocean bed. The suspended hook and live bait or artificial bait secured to the fish line is thereby positioned to facilitate and optimize hook-up with a striking fish.

Some bottom bouncers are supported to slide along a fish line in the fashion of a "lindy rig" and cooperate with stops (e.g. knots, split shot, pegs) secured to the line or sinker to restrict sinker movement or permit line movement upon detecting a fish bite, placing a fishing reel in a free spool condition and allowing the sinker to settle to the bottom. In the latter condition and after a fish takes the bait and hook, the line is released to a "free spool" condition to allow the fish to move freely without the drag of the sinker.

Some bottom bouncers also provide constructions that permit weight movement along the wire support or permit the changing of the amount of weight secured to the wire support. U.S. Pat. No. 2,589,715 provides fore and aft set screw pieces that secure detachable intermediate weight pieces to a wire support. U.S. Pat. Nos. 4,750,289 and 5,253,447 provide wire supports with latch arms that detachably secure a desired number or several weight pieces or sinkers of preferred sizes to the wire support along side the latch arm.

The present invention provides a novel, improved "bottom bouncer" type sinker wherein a weight supporting arm of a wire support is shaped to interact with a recess or aperture at a weight piece to detachably secure the weight piece to the wire support arm. In one form, an offset, U-shaped or other appropriate shaped bend is provided at the weight support arm that cooperates with a slot and depression in a weight piece to permit the arm to be deflected to interlock or release the bend from the weight piece.

A molded latch or lock piece is separately mounted to slide along the wire support arm to interlock with the weight piece (e.g. a bore) to prevent detachment of the weight piece. The lock piece includes a restraint piece or is formed to provide a surface or bore of slightly smaller diameter than the wire arm to tightly grip, yet slide along the wire arm. The wire support arm(s) can independently support other fish attractors such as a rattle chamber or slide clevis, among other accessory pieces. Alternative bottom bouncer sinker configurations can provide luminous materials or devices, rattle pieces or ballast materials within the weighted body piece and/or provide a slide connector that mounts to a fish line.

SUMMARY OF THE INVENTION

It is a primary object of the invention is to provide a fishing sinker that detachably supports a weighted ballast piece to a wire support arm that can be changed at will.

It is further object of the invention to provide a fishing sinker having a molded latch piece that compressively grips a wire support arm and can be manipulated to mount in the interior of a hollow bore or cavity space of a weighted ballast piece also attached to the arm.

It is further object of the invention to provide a U-shaped or offset bend at a wire support arm that selectively interlocks with a depression in a weight piece or ballast piece to attach and detach the weight piece to the support arm.

It is further object of the invention to provide a weight piece with a slot or cavity space adjacent a depression that receives a bent or offset region of a wire support arm and within which cavity space the arm can flex to attach and detach the bent region from the depression and thereby the arm from the weight piece.

It is further object of the invention to provide a sinker including a molded latch piece having a bore sized and/or surface shaped to grip a wire support arm to selectively interlock with a ballast piece supported to the arm to prevent or permit deflection of the arm within the ballast piece to restrain or release the weight piece from the arm.

It is further object of the invention to provide a sinker wire support arm adapted to support sundry attractor accessories to the support arm (e.g. rattle chambers and/or luminous members and/or luminous devices and/or scent devices, etc.).

The foregoing objects, advantages and distinctions of the invention are obtained in a presently preferred, novel, improved sinker or "bottom bouncer" wherein a flexible wire support arm mounts in a bore of a ballast piece. The weight piece is formed from a heavy weight material relative to water. The arm includes an offset bent region (e.g. U-shaped) that cooperates with a slot and depression at the weight piece to permit the arm to flex in the weight piece to attach and detach the bent region from the ballast piece.

A latch piece is mounted to the ballast support arm to restrict deflection of the arm. In one construction a latch piece tightly grips, yet slides along the arm and mounts within a bore or cavity space of the'ballast piece in a manner that prevents arm deflection, unless the latch is released from the weight piece.

The wire support arm also provides a line attachment bend that defines distinct shoulders at the juncture between a ballast arm and a bait support arm. The bend and shoulders maintain a preferred alignment of the sinker to a supporting fishing line during the playing of a fish. An accessory rattle attractor is also shown attached to the bait support arm. Still other attractor pieces can be supported to the wire form arms or be molded into or coupled to the weight piece to enhance audible and visual qualities of the sinker assembly. For example, the sinker assembly can include or contain reflective, luminous materials, scent materials, luminous devices, rattle pieces, spinner blades and/or a variety of latch pieces that interlock with the weight piece.

An alternative, single arm "bottom bouncer" sinker is also disclosed that is supported to slide relative to a fishing line.

Still other objects, advantages, distinctions, constructions and combinations of individual features of the invention will become more apparent from the following description with respect to the appended drawings. The various features can be used alone or in combination. The description to each combination should therefore not be literally construed in limitation of the invention. Rather, the invention should be interpreted within the broad scope of the further appended claims.

BRIEF DESCRIPTION OF THE DRAWINGS

The following figures disclose presently preferred constructions of the invention. Similar components and assemblies are referred to in the various drawings with similar alphanumeric reference characters and callouts.

DESCRIPTION OF THE PREFERRED EMBODIMENT

Figure 1:
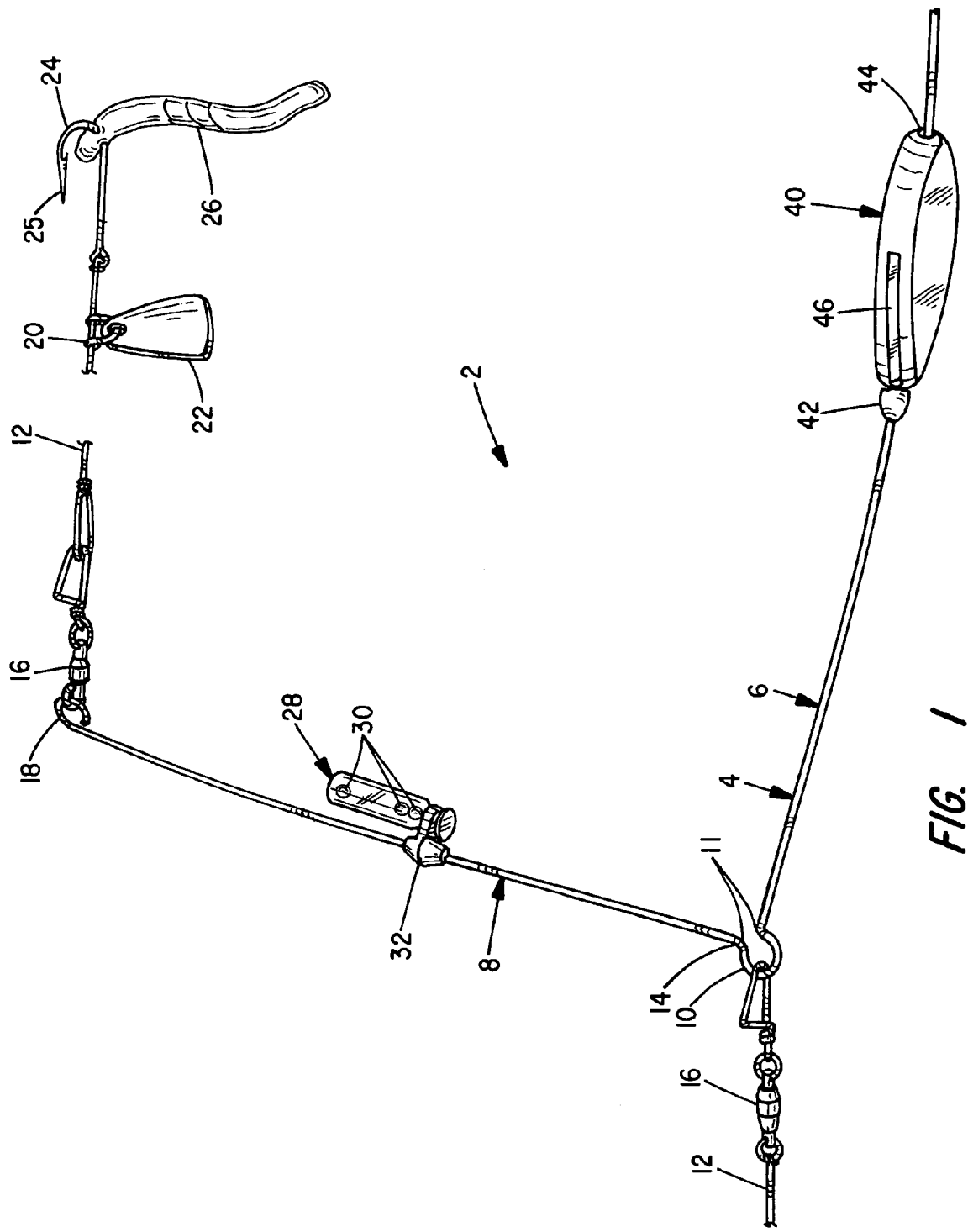
FIG. 1 is a perspective drawing showing one construction of the sinker in a two-arm, L-shaped "bottom bouncer" configuration.

Referring to FIGS. 1 through 5, several views are shown to the construction of a novel fishing sinker assembly or bottom bouncer 2 of the invention. The sinker 2 includes a wire formed support 4 having a weight or ballast arm 6 and a bait attachment arm 8. The wire support 4 is constructed from a non-corrosive metal. Although two arms are shown, the sinker 2 can include more or less arms.

The arms 6 and 8 intersect at an aft side of a generally circular bent region 10. The arms 6 and 8 project from the bend 10 in a range of 85° to 90° to define shoulders 11 and a narrow gap 14. A fishing line 12 is typically attached to the bend region 10 with the aid of a snap swivel 16 or other suitable fastener. Normal tension on the fishing line during retrieval of the sinker 2 or while fighting a fish prevents the line 12 from slipping past the shoulders 11 and through the gap 14. The novel line attachment bend 10 thus prevents the fishing line 12 from sliding down either arm 6 or 8 to unbalance the sinker 2. Predecessor multi-arm sinkers typically provide line attachment bends that can promote line slippage and possible line tracking difficulties or loss of a fish.

The bait attachment arm 8 includes a twisted eyelet 18 at a distal end that supports a snap swivel 16. A snell assembly constructed from a suitable length of fish line 12 and including an exemplary clevis 20, spinner blade 22, fish hook 24 and live bait 26 (e.g. leech, worm, night crawler, minnow etc.) is fastened to and trails from the swivel 16. Artificial baits may also be secured in a variety of fashions to the swivel 16. The hook 24 can be constructed to any desired shape and size and can include one or more barbed ends 25. The live bait 26 can comprise any desired bait preferred by a species of fish being fished. Artificial baits (e.g. flies, jigs, plug lures, spinner lures etc.) may also be secured to the fish line 12 alone or in combination with other hooks 24 and/or live bait 26.

Mounted along the bait arm 8 is a hollow rattle chamber 28 that supports a number of rattle pieces or beads 30. The chamber 28 and rattle pieces 30 can be constructed of any materials that desirably interact to produce audible sounds. A resilient retainer 32 secures the chamber 28 to the arm 8. Other audible, tactile, visual and/or scent attractors can be secured to either arm 6 and/or 8. The attractors can be colorized with appropriate paints, flash or glow materials or filamentary members. A common attractor might be a clevis 20 and suitably shaped spinner blade 22 (e.g. Colorado, Indiana, willow).

Mounted to the ballast arm 6 is a relatively heavy weight piece or ballast piece 40 (e.g. ½ to 6 ounces). The ballast piece 40 is typically molded from a material having a high density or specific gravity relative to water (e.g. lead, steel, among a variety of other molded, machined or composite materials). The ballast piece 40 exhibits a negative buoyancy to submerse the sinker assembly 2 on or near the bottom of a body of water. The amount of weight required depends upon the movement of a boat containing the fisherman.

The novel ballast piece 40 finds particular advantages, since a fisherman is able to change the weight of the ballast piece 40 at will by merely detaching a weight piece 40 of undesired size/shape from the arm 6 and reattaching another weight piece 40 of appropriate size/shape. The changing of any ballast piece 40 is readily achieved due to the novel fastening system that is incorporated into the arm 6 and ballast piece 40 that are described in more detail below.

The body of the ballast or weight piece 40 can be constructed to any preferred shape and weight. A tubular, torpedo shape (e.g. ellipsoidal) is presently preferred. Nominal weight sizes useful for fresh water applications can run in a range of ¼ to 6 ounces or any other desired weight. The depicted flat sided ellipsoidal shaped body is preferred due to the hydro-dynamics of the body and low resistance to snagging when debris, rocks, weeds etc. are encountered. Ballast pieces 40 of other shapes and lengths can alternatively be secured to the weight or ballast support arm 6.

The ballast piece 40 can also accommodate other permanent or detachable attractor elements, for example, rigid filaments, joints, cavities or attached attractors. The attractors can be molded into the ballast piece 40 and/or secured to the sinker 2 to increase the profile of the sinker 2 to fish by increasing visibility, creating sounds, releasing scent and/or prevent snagging, among other desired attributes.

Figure 3:
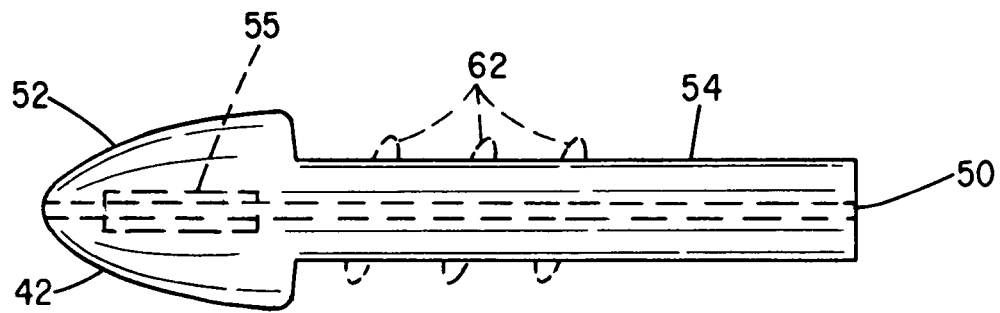
FIG. 3 is a plan drawing showing the latch piece of FIGS. 1 and 2 in enlarged detail and with a possible molded in-place internal gripping piece in dashed line.
Figure 4:
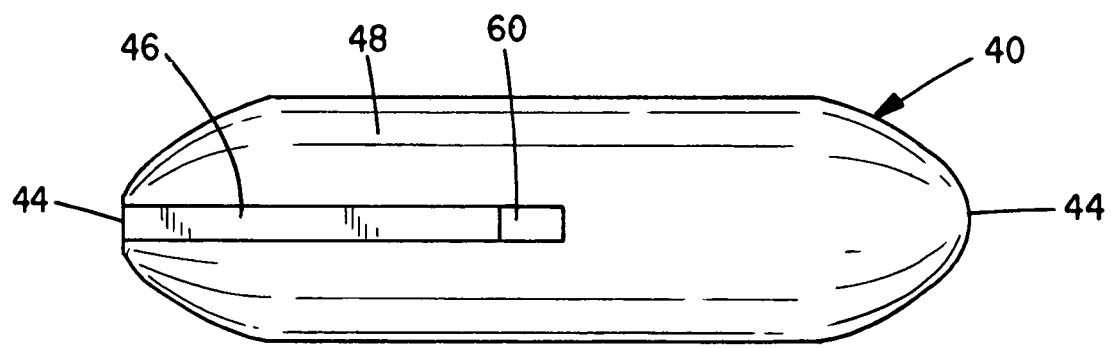
FIG. 4 is a plan drawing showing a top view exposing the arm deflection cavity space and portion of the adjacent bend receiving depression, bore or cavity at the weight piece.

The ballast piece 40 is secured to the arm 6 with a latch piece 42 that mounts in an internal longitudinal through bore 44 of the ballast piece 40. The bore 44 communicates with a slot or cavity space 46 that is exposed through a sidewall 48 of the ballast piece 40. The cavity space 46 longitudinally extends parallel to the bore 44 from one end to slightly past the center of the body. The wire support arm 6, in turn, extends through a longitudinal bore 50 of the latch piece 42 and the bore 44 of the ballast piece 40. Details to the mounting of the latch piece 42 to the ballast piece 40 and of the support arm 6 to the ballast piece 40 are shown in exploded assembly and in dashed line at FIGS. 2 and 5. FIGS. 3 and 4 also depict enlarged views to the construction of the latch piece 42 and the ballast piece 40.

With additional attention to FIG. 3, the latch piece 42 exhibits a tapered (e.g. conical) head 52 and a trailing tubular body 54. The bore 50 extends concentrically and longitudinally through the latch piece 42. The material is selected and the diameter of the bore 50 is sized to assure that the latch piece 42 tightly grips, yet slides along the arm 6. A tight fitting tubular retainer piece 55 (shown in dashed line and formed from an appropriate material and diameter bore size) can alternatively be molded into the latch piece 42 to assure a non-slip mounting to the wire arm 6. The non-slip mounting and fitting of the body 54 into the ballast bore 44 prevents the wire arm 6 from accidentally deflecting to release the ballast piece 40 from the weight or ballast arm 6 as shown in dashed line at FIG. 2.

The latch piece 42 is threaded onto the arm 6 before an offset bend 56 is formed into the arm 6. A U-shaped, transverse extending bend 56 is presently formed although other symmetrical or offset shapes can be formed into the arm 6 (e.g. V, Z, twist, or spiral shapes etc.). The bend 56 is sized to nest or interlock with a depression, recess or aperture 60 formed into the ballast piece 40 that communicates with the cavity space 46 and bore 44.

Figure 2:
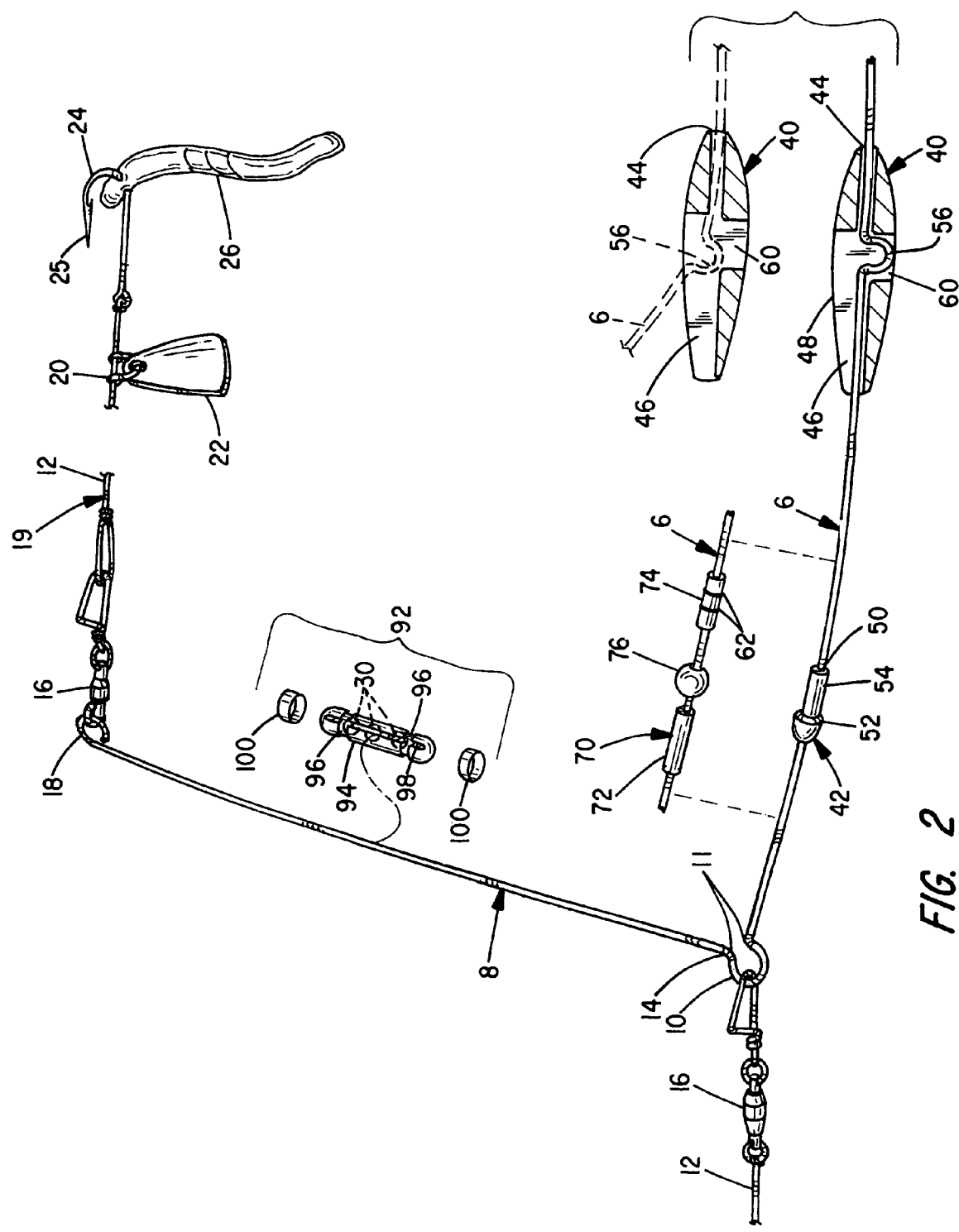
FIG. 2 is a perspective drawing showing the weight piece or ballast piece and the latch piece of FIG. 1 in longitudinal cross section and dashed line assembly and solid line exploded assembly along the ballast arm of the sinker and with a bead containing rattle chamber mounted to a bait attachment arm and an alternative latch assembly displaced to the side of the ballast arm.

As shown in dashed line at FIG. 2 with the latch piece 42 extracted from the cavity space 46 and ballast piece 40, the wire support arm 6 can be deflected from the cavity space 46 and depression 60 to release the bend 56 from the depression 60 and the ballast piece 40 from the wire support arm 6. That is, upon releasing the bend 56 from the depression 60, the ballast piece 40 can be removed from the wire support arm 6 and a new weight or ballast piece 40 or lesser or greater weight can be attached.

To maintain a secure attachment of the latch piece 42 to the arm 6, the body 54 of the latch piece 42 can also include a series of raised ridges, flanges or projections 62, shown in dashed line at FIG. 3. The ridges 62 facilitate mounting and retention of the latch piece 42 to the bore 44. Once inserted into the bore 44, the ridges 62 compressively grip the walls of the bore 44 to retain the latch piece 42 to the ballast piece 40 against substantially all normal conditions.

An alternative latch assembly 70 is shown at FIG. 2 that is displaced to one side of the wire support arm 6. The latch assembly provides a slide piece 72 having a bore or other internal bore surfaces adapted to grip the arm 6 and that cooperates with a peg piece 74 that mounts in the bore 44. An intervening bead 76 is normally bonded to the peg piece 74. The peg piece 74 may also include a smaller diameter bore versus the support arm 6 and/or projecting ridges 62 to facilitate retention to the ballast piece 40 and/or negate the need for or use of the slide piece 72. Collectively the pieces 72, 74 and 76 reciprocate to and fro along the wire arm 6 to mate with or detach from the bore 44 to prevent or permit deflection of the arm 6. It is to be appreciated a variety of other latch pieces can cooperate with the bore 44 and/or cavity space 46 and/or body of the ballast piece 40 to prevent or permit flexion of the arm 6.

Figure 5:
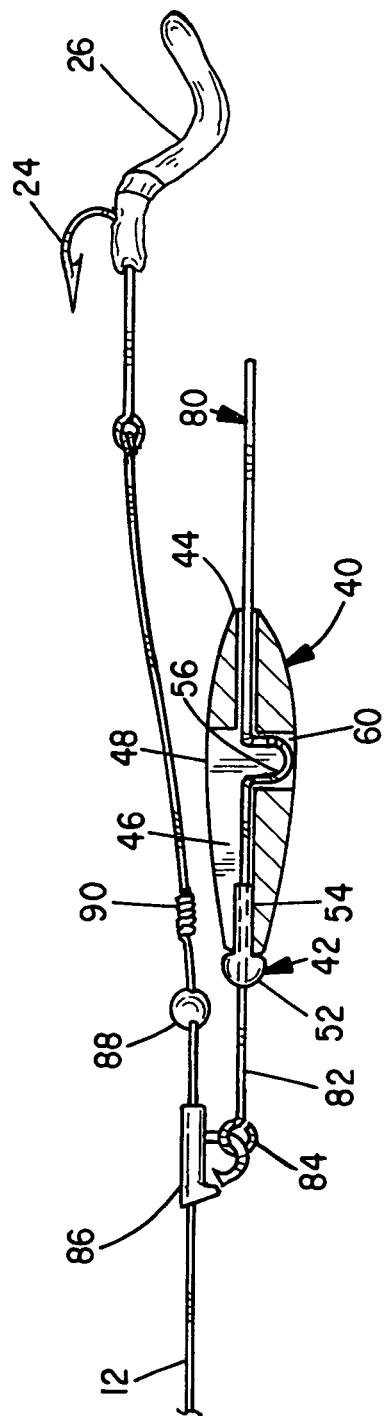
FIG. 5 is a perspective drawing showing a single arm bottom bouncer sinker that is detachably mounted to a clevis supported to a fishing line and wherein the weight piece is shown in longitudinal cross section as it appears when restrained to the ballast arm.

FIG. 5 depicts an exemplary one arm sinker 80 construction having a single wire support arm 82 that includes a twisted eyelet 84 at a fore end. The eyelet 84 is secured to a clevis 86 that is slide mounted to a fish line 12. A bead 88 and bobber stop 90 secured to the line 12 form a "lindy rig" whereby a hook 24 and live bait 26 can be allowed to float free when a bite is detected. That is, upon detecting a bite or strike, the fish line can be released to a free spool condition to allow a fish to run with the bait 26 without the drag of the ballast piece 40.

Also shown at FIG. 2 is an alternative rattle piece 92 that can be adapted to the sinkers 2 and 80. The rattle piece 92 provides a hollow housing 94 that contains several rattle pieces 30 that interact with the housing 94 to create audible sounds. The wire support arm 8 nests in a longitudinal groove 98 at the housing 94. Associated grooves 96 encircle the housing 94 and receive elastomer bands 100, wire ties or other C-shaped or open-sided clip fasteners to secure the housing 94 to the wire support arm 8.

While the invention is shown and described with respect to a presently preferred sinker assembly and several considered improvements, modifications and/or alternatives thereto, still other sinker assemblies and arrangements may be suggested to those skilled in the art. It is also to be appreciated that the singular features of the sinker can be arranged in different combinations. The foregoing description should therefore be construed to include all those embodiments within the spirit and scope of the following claims.

What is claimed is:

1. A fishing sinker comprising:
  a) an elongated flexible wire support having a weight retainer bend that transversely projects from a longitudinal axis of the support; and
  b) a weight piece exhibiting a specific gravity substantially greater than the specific gravity of water and including a through bore extending from a fore end of said weight piece to an aft end of said weight piece, a cavity space defining a channel exposed through an external wall of the weight piece and having opposed internal walls and communicating with said bore, and an aperture exposed through the external wall of the weight piece intermediate said fore and aft ends and that extends into said weight piece and communicates with said bore and cavity space, said cavity and said aperture being exposed through the external wall of the weight piece on opposing sides of the weight piece, wherein the wire support extends a length of said bore completely through said weight piece, wherein said cavity space is adapted i) to permit the wire support to flex as it is threaded through the bore and engage the retainer bend in the aperture in the weight piece where the wire support is secured to said weight piece and ii) to permit the wire support to flex at the retained position to release the retainer bend and wire support from said weight piece.

2. A fishing sinker as set forth in claim 1 including a latch piece and wherein said latch piece is reciprocally mounted to said wire support to interlock with said cavity space to prevent the release of said wire support from said weight piece.

3. A fishing sinker as set forth in claim 2 wherein said latch piece includes a longitudinal bore and wherein said wire support is threaded through the longitudinal bore.

4. A fishing sinker as set forth in claim 3 wherein the longitudinal bore of said latch piece exhibits a diameter less than a diameter of the wire support to frictionally engage said latch piece to said wire support.

5. A fishing sinker as set forth in claim 2 wherein the weight retainer bend comprises a generally U-shaped bend displaced intermediate first and second ends of an arm of said wire support.

6. A fishing sinker as set forth in claim 1 wherein said aperture transversely extends from a longitudinal axis of said bore into said weight piece and wherein said weight retainer bend is secured in an un-flexed condition.

7. A fishing sinker as set forth in claim 1 wherein said wire support comprises first and second arms, wherein the weight retainer bend is formed in said first arm, wherein said second arm transversely projects from said first arm at a line attachment bend, and wherein at least one of said first and second arms includes means for supporting a fishing bait.

8. A fishing sinker as set forth in claim 7 wherein the first and second arms project substantially orthogonal to first and second shoulders respectively defined at said line attachment bend and wherein said first and second shoulders are formed to prevent a fishing line attached to the bend from migrating onto either of the first or second arms during line retrieval.

9. A fishing sinker comprising:
  a) an elongated flexible wire support wherein said wire support comprises first and second arms, wherein a generally U-shaped retainer bend is formed in said first arm, wherein said second arm transversely projects from said first arm at a line attachment bend, and wherein said second arm includes means for supporting a fishing bait; and
  b) a weight piece exhibiting a specific gravity substantially greater than the specific gravity of water including a through bore extending from a fore end to an aft end of said weight piece, a cavity space defining a channel exposed through an external wall of the weight piece and having opposed internal walls and communicating with said bore, and an aperture exposed through an external wall of the weight piece intermediate said fore and aft ends that communicates with said bore and cavity space, said cavity and said aperture being exposed through the external wall of the weight piece on opposing sides of the weight piece, wherein said first arm extends a length of said bore completely through said weight piece, wherein said cavity space is adapted i) to permit the first arm to flex as it is threaded through the bore and capture the retainer bend in the aperture to secure said wire support to said weight piece and ii) to permit the first arm to flex and detach the retainer bend from the aperture to release the retainer bend and wire support from said weight piece.

10. A fishing sinker as set forth in claim 9 wherein the line attachment bend includes first and second shoulders formed at junctions with said first and second arms and wherein said first and second shoulders each exhibit a shape that prevents a fishing line attached to the line attachment bend from migrating onto either of the first or second arms during line retrieval.

11. A fishing sinker as set forth in claim 9 wherein said aperture communicates with the weight piece bore and extends into said weight piece relative to a longitudinal axis of the weight piece bore and wherein said weight retainer bend nests in said aperture in an un-flexed retained condition.

12. A fishing sinker as set forth in claim 11 wherein said aperture is exposed through the external wall of said weight piece.

13. A fishing sinker as set forth in claim 9 including a latch piece having a longitudinal bore through which said first arm is threaded and mounted to move to and fro along the first arm and wherein said latch piece interlocks with said cavity space to prevent the release of said first arm from said weight piece.

14. A fishing sinker comprising:
  a) an elongated flexible wire support having first and second arms that transversely project from a line attachment bend, wherein one of said first and second arms includes a weight retainer bend that transversely projects from the one of said first and second arms, and wherein an other of said first and second arms includes means for supporting a fishing bait;
  b) a latch piece having a longitudinal bore through which the one of the first and second arms having the weight retainer bend is threaded to move to and fro along the arm; and
  c) a weight piece exhibiting a specific gravity substantially greater than the specific gravity of water and including a through bore and a cavity space exposed through a wall of the weight piece and communicating with said bore, wherein the one of the first and second arms having the weight retainer bend is threaded through the weight piece bore, wherein said cavity space is adapted i) to permit the one of the first and second arms to flex as it is threaded into the bore and capture the retainer bend to the weight piece where the one of the first and second arms returns to an un-flexed retained condition and secures said wire support to said weight piece and ii) to permit the one of the first and second arms to flex at the retained condition to release the retainer bend and wire support from said weight piece, and wherein said latch piece interlocks with said cavity space to prevent the release of said wire support from said weight piece.

15. A fishing sinker as set forth in claim 14 wherein said cavity space comprises a slotted channel that extends into the weight piece having opposed interior walls.

16. A fishing sinker as set forth in claim 15 wherein said latch piece mounts between the opposed interior walls of said cavity space.

17. A fishing sinker as set forth in claim 14 wherein said retainer bend nests in a depression in said weight piece that communicates with said cavity space.

18. A fishing sinker comprising:
  a) an elongated flexible wire support having first and second arms that project from a line attachment bend, wherein said first arm includes a weight retainer bend, and wherein said second arm includes means for supporting a fishing bait;
  b) a latch piece having a longitudinal bore through which said first arm is threaded and mounted to move to and fro along the first arm; and
  c) a weight piece exhibiting a specific gravity substantially greater than the specific gravity of water and including a through bore and a cavity space exposed through a wall of the weight piece and communicating with said bore, wherein said first arm extends through the weight piece bore, wherein said cavity space is adapted to permit the first arm to flex as the first arm is mounted to said bore to secure the weight retainer bend to said weight piece at a first arm position and to flex from said first arm position to a second arm position to release the retainer bend from the weight piece and wherein said latch piece interlocks with said cavity space to prevent the release of said first arm from said weight piece.

19. A fishing sinker as set forth in claim 18 wherein the retainer bend is secured at said first arm position in an aperture that communicates with the cavity space and that transversely extends from a longitudinal axis of said bore.

20. A fishing sinker as set forth in claim 18 wherein said wire support includes the first and second arms that project substantially orthogonal to each other at first and second shoulders defined at the line attachment bend and wherein said first and second shoulders exhibit shapes that prevent a fishing line attached to the bend from migrating onto either of the first or second arms during line retrieval.

* * * * *